(12) United States Patent
Cotton (10) Patent No.: US 10,120,483 B2
(45) Date of Patent: Nov. 6, 2018

(54) APPARATUS HAVING TOUCH AND BENDING SENSING FUNCTIONS

(71) Applicant: Nokia Technologies Oy, Espoo (FI)

(72) Inventor: Darryl Cotton, St. Ives (GB)

(73) Assignee: Nokia Technologies Oy, Espoo (FI)

( * ) Notice: Subject to any disclaimer, the term of this patent is extended or adjusted under 35 U.S.C. 154(b) by 82 days.

(21) Appl. No.: 15/033,140

(22) PCT Filed: Oct. 30, 2014

(86) PCT No.: PCT/FI2014/050813
§ 371 (c)(1),
(2) Date: Apr. 29, 2016

(87) PCT Pub. No.: WO2015/067847
PCT Pub. Date: May 14, 2015

(65) Prior Publication Data
US 2016/0253031 A1    Sep. 1, 2016

(30) Foreign Application Priority Data
Nov. 8, 2013  (GB) .................................. 1319708.2

(51) Int. Cl.
| | |
|---|---|
| G06F 3/041 | (2006.01) |
| G06F 3/042 | (2006.01) |
| G06F 1/16 | (2006.01) |
| G06F 3/044 | (2006.01) |
| G06F 3/0354 | (2013.01) |

(52) U.S. Cl.
CPC .......... *G06F 3/0416* (2013.01); *G06F 1/1652* (2013.01); *G06F 3/044* (2013.01); *G06F 3/0414* (2013.01); *G06F 3/0421* (2013.01); *G06F 3/0354* (2013.01); *G06F 2203/04102* (2013.01); *G06F 2203/04107* (2013.01); *G06F 2203/04108* (2013.01)

(58) Field of Classification Search
CPC ......... G06F 1/1652; G06F 2203/04102; G06F 3/044; G06F 3/041; G06F 3/0416; G06F 3/0412; G06F 1/1643; G06F 3/04886; G01P 15/125; G01P 15/0802; G01P 15/18; G01P 15/0922; G01P 15/131; G01L 9/0072; G01L 9/0005; G01L 9/003; G01D 5/2412; H03K 17/975
See application file for complete search history.

(56) References Cited

U.S. PATENT DOCUMENTS

| | | | | |
|---|---|---|---|---|
| 5,610,528 A | * | 3/1997 | Neely ................... | A61B 5/1071 324/660 |
| 7,509,870 B2 | * | 3/2009 | Aebersold ............... | G01L 1/148 73/775 |
| 9,207,818 B2 | * | 12/2015 | Kang ...................... | G06F 3/044 |

(Continued)

*Primary Examiner* — Sanjiv D Patel
(74) *Attorney, Agent, or Firm* — Harrington & Smith (57) ABSTRACT

An apparatus including in a first laterally extending layer, a flexible substrate; in a second laterally extending layer, a plurality of distinct sensors configured to sense over a sensing area; in a third laterally extending layer, a modifier including a perimeter, wherein the apparatus is configured to enable, responsive to flexing of the flexible substrate, lateral movement of the perimeter of the modifier relative to the plurality of distinct sensors to modify sensing by one or more of the distinct sensors.

19 Claims, 7 Drawing Sheets

(56) References Cited

U.S. PATENT DOCUMENTS

| | | | |
|---|---|---|---|
| 2007/0040107 A1* | 2/2007 | Mizota | B25J 13/084 |
| | | | 250/221 |
| 2011/0057670 A1* | 3/2011 | Jordan | G06F 3/0416 |
| | | | 324/679 |
| 2012/0127112 A1* | 5/2012 | Lu | G06F 3/044 |
| | | | 345/174 |
| 2012/0227259 A1* | 9/2012 | Badaye | G06F 3/044 |
| | | | 29/846 |
| 2012/0256720 A1 | 10/2012 | Byun et al. | 338/2 |
| 2013/0033450 A1* | 2/2013 | Coulson | G06F 3/044 |
| | | | 345/174 |
| 2013/0145311 A1* | 6/2013 | Joo | G06F 3/04886 |
| | | | 715/788 |
| 2013/0201093 A1 | 8/2013 | Kim et al. | 345/156 |
| 2013/0215035 A1* | 8/2013 | Guard | G06F 3/0221 |
| | | | 345/168 |
| 2014/0192007 A1* | 7/2014 | Westhues | G06F 3/044 |
| | | | 345/174 |

* cited by examiner

APPARATUS HAVING TOUCH AND
BENDING SENSING FUNCTIONS

TECHNOLOGICAL FIELD

Embodiments of the present invention relate to an apparatus. In particular, they relate to an apparatus comprising a plurality of sensors over a sensing area.

BACKGROUND

Current touch sensitive displays may use a plurality of sensors distributed over a sensing area. The sensors sense a proximal object such as a user's finger touching the sensing area.

BRIEF SUMMARY

According to various, but not necessarily all, embodiments of the invention there is provided an apparatus comprising: in a first laterally extending layer, a flexible substrate; in a second laterally extending layer, a plurality of distinct sensors configured to sense over a sensing area; in a third laterally extending layer, a modifier comprising a perimeter, wherein the apparatus is configured to enable, responsive to flexing of the flexible substrate, lateral movement of the perimeter of the modifier relative to the plurality of distinct sensors to modify sensing by one or more of the distinct sensors.

According to various, but not necessarily all, embodiments of the invention there is provided a method comprising: processing outputs from a plurality of distinct sensors distributed over a sensing area of an apparatus to disambiguate between the existence of touch of an object at one or more positions in the sensing area and flexing of the apparatus.

According to various, but not necessarily all, embodiments of the invention there is provided a method comprising: in a first touch sensing mode of an apparatus, electrically interconnecting a first conductive portion and a second conductive portion to form a guard electrode for a plurality of capacitive sensor electrodes; and in a second flex sensing mode, electrically disconnecting the first conductive portion and the second conductive portion to form at least one modifier comprising a perimeter, wherein, in response to flexing the apparatus, the perimeter of the modifier moves relative to the plurality of capacitive sensor electrodes to modify sensing by at least one of the capacitive sensor electrodes.

According to various, but not necessarily all, embodiments of the invention there is provided an apparatus comprising: at least one processor; and
at least one memory including computer program code the at least one memory and the computer program code configured to, with the at least one processor, cause the apparatus at least to perform: processing outputs from a plurality of distinct sensors distributed over a sensing area of an apparatus to disambiguate between the existence of touch of an object at one or more positions in the sensing area and flexing of the apparatus.

According to various, but not necessarily all, embodiments of the invention there is provided an apparatus comprising: at least one processor; and
at least one memory including computer program code, the at least one memory and the computer program code configured to, with the at least one processor, cause the apparatus at least to perform:
in a first touch sensing mode of an apparatus, electrically interconnecting a first conductive portion and a second conductive portion to form a guard electrode for a plurality of capacitive sensor electrodes; and
in a second flex sensing mode, electrically disconnecting the first conductive portion and the second conductive portion to form
at least one modifier comprising a perimeter, wherein, in response to flexing the apparatus, the perimeter of the modifier moves relative to the plurality of capacitive sensor electrodes to modify sensing by at least one of the capacitive sensor electrodes According to various, but not necessarily all, embodiments of the invention there is provided an apparatus comprising: in a laterally extending sensing layer, a plurality of distinct sensors configured to sense over a sensing area; in a third laterally extending modifier layer, a modifier comprising a perimeter,
wherein the apparatus is configured to enable, responsive to flexing of the apparatus, lateral movement of the perimeter of the modifier relative to the plurality of distinct sensors to modify sensing by one or more of the distinct sensors.

BRIEF DESCRIPTION

For a better understanding of various examples of embodiments of the present invention reference will now be made by way of example only to the accompanying drawings in which.

DETAILED DESCRIPTION

The Figures schematically illustrate a flexible apparatus 10 comprising:
in a second laterally extending sensor layer L2, a plurality of distinct sensors configured to sense over a sensing area 4; in a laterally extending modifier layer L3, a modifier 20 comprising a perimeter 22, wherein the flexible apparatus 10 is configured to enable, responsive to flexing of the flexible apparatus 10, lateral movement of the perimeter 22 of the modifier 20 relative to the plurality of distinct sensors 12 to modify sensing by one or more of the distinct sensors 12.

Figure 1:
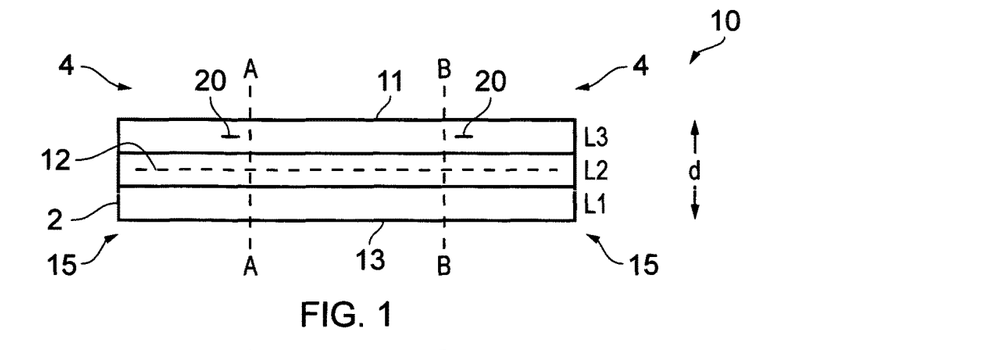
FIG. 1 illustrates an example of an apparatus for sensing a parameter, where sensing of that parameter changes when the apparatus flexes.

FIG. 1 illustrates an example of an apparatus 10 comprising:
in a first laterally extending layer L1, a flexible substrate 2;
in a second laterally extending layer L2, a plurality of distinct sensors configured to sense over a sensing area 4; in a third laterally extending layer L3, a modifier 20 comprising a perimeter 22, wherein the apparatus 10 is configured to enable, responsive to flexing of the flexible substrate 2, lateral movement of the perimeter 22 of the modifier 20 relative to the plurality of distinct sensors 12 to modify sensing by one or more of the distinct sensors 12.

Figure 2:
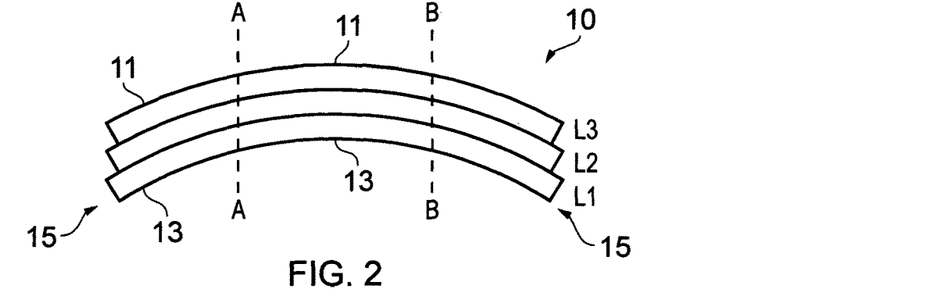
FIG. 2 illustrates the example of the apparatus of FIG. 1 when flexed.

The apparatus senses a parameter and the sensing of that parameter changes when the apparatus 10 flexes, for example as illustrated in FIG. 2.

Figure 7:
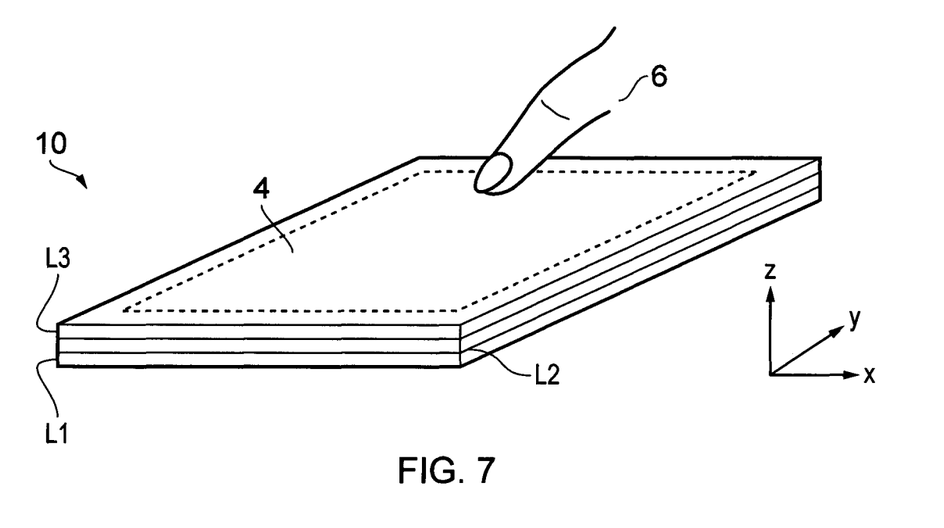
FIG. 7 illustrates an example of the apparatus from a top perspective view illustrating the lateral extent of the sensing area and layers.

In the illustrated example, the apparatus 10 is formed from distinct layers L1, L2, L3 which are stacked to a depth d. The layers L1, L2, L3 extend laterally in the sense that they have dimensions (length, width) normal to the direction of stacking, for example, as illustrated in FIG. 7. in the x-y plane. In some but not necessarily all embodiments, the laterally extending layers L1, L2, L3 may be parallel and occupy x-y planes that are normal to the direction of stacking z.

The apparatus 10 comprises a flexible substrate 2 in a first laterally extending layer L1.

The apparatus 10 comprises a plurality of distinct sensors 12 in a second laterally extending layer L2. The sensors 12 are configured to sense over a laterally extending sensing area 4.

The apparatus 10 comprises one or more modifiers 20 in a third laterally extending layer L3. Each modifier 20 comprises a perimeter 22.

Figure 6:
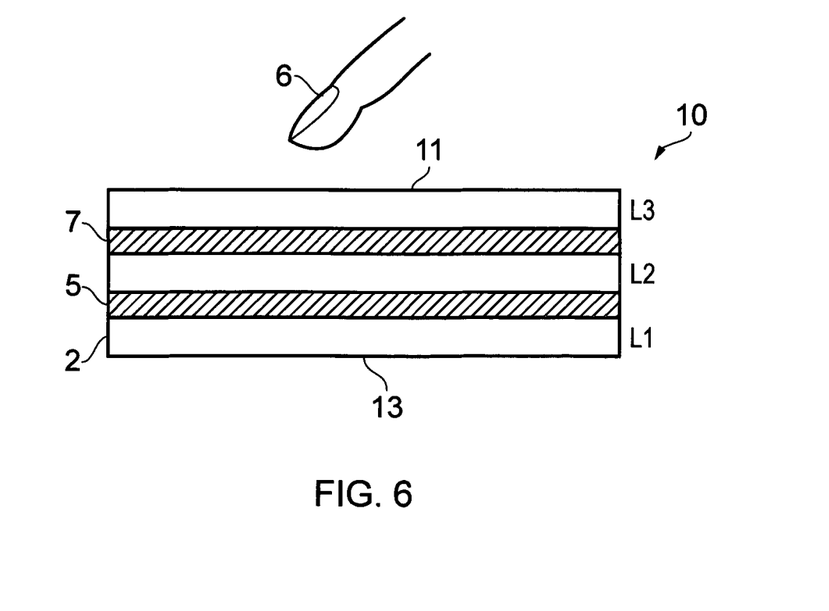
FIG. 6 illustrates an example of an apparatus comprising one or more intermediate layers.

In the illustrated example, but not necessarily all examples, the layers are stacked in the order of the first layer L1, the second layer L2 and the third layer L3. It is important to note, however, that the order may be reversed or otherwise changed. In some examples there may be none, one or more intermediate layers between any pairing of adjacently stacked ones of the first layer L1, the second layer L2 and the third layer L3. For example, FIG. 6 illustrates the use of intermediate layers 5, 7.

The apparatus 10 is configured to enable, responsive to flexing of the flexible substrate 2, lateral movement of the perimeter 22 of the modifier 20 relative to the plurality of distinct sensors 12 to modify sensing by one or more of the distinct sensors 12 of a parameter.

The relative movement of the modifier 20, as a consequence of flexing the apparatus 10, modifies the sensing of the parameter.

FIG. 2 illustrates a macro-scale flexing of the apparatus 10, in which endpoints 15 of the apparatus 10 move relative to each other. In this example, but not necessarily all examples, they move towards each other. An upper surface 11 and a lower surface 13 of the apparatus 10 both flex similarly. The lower surface 13 and the upper surface 11 are both curved in the same sense by flexing. In this example, but not necessarily all example, they remain parallel as they curve. Parallel in this sense means that the upper surface 11 and the lower surface 13 are spaced substantially uniformly before flexing and are spaced substantially uniformly after flexing. The strain introduced by the flexing is transferred laterally through each layer of the apparatus 10. In other examples, flexing may bend the lower surface 13 and the upper surface 11 in the same sense and move them close together.

In the example of FIG. 2, the flex is outwardly convex with the upper surface 11 forming a convex shape when viewed externally and the lower surface 13 forming a concave shape when viewed externally. As the apparatus 10 has a depth d, the upper surface 11 is stretched while the lower surface 13 is compressed. In the illustrated example, this results in slippage between at least the second layer L2 and the third layer L3. This slippage facilitates lateral movement of the perimeter 22 of the modifier 20 relative to the plurality of distinct sensors 12

In other examples, the flex may be inwardly convex with the lower surface 13 forming a convex shape when viewed externally and the upper surface 11 forming a concave shape when viewed externally. As the apparatus 10 has a depth d, the lower surface 13 is stretched while the upper surface 11 is compressed. In this example, this results in slippage between at least the second layer L2 and the third layer L3. This slippage facilitates lateral movement of the perimeter 22 of the modifier 20 relative to the plurality of distinct sensors 12.

The term 'flex' is intended to encompassing bending, twisting and contorting. In some examples, for example FIG. 2, the flex may be a bend. In other examples, the flex may be a twist (with or without a bend). In still other examples, the flex may be a contortion other than a bend or twist.

FIGS. 3A and 3B and FIGS. 4A and 4B illustrate examples of lateral movement 26 of the perimeter 22 of a modifier 20 relative to a sensor 12.

Figure 3A:
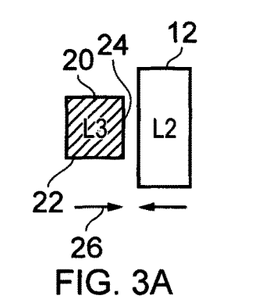
FIGS. 3A and 3B and FIGS. 4A and 4B illustrate examples of lateral movement of the perimeter of a modifier relative to a sensor.
Figure 3B:
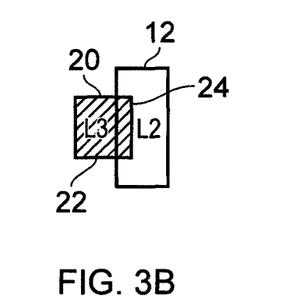

FIG. 3A illustrates the relative position of a sensor 12 and a modifier 20 along the line A-A illustrated in FIG. 1. FIG. 3B illustrates the relative position of the same sensor 12 and the same modifier 20 along the line A-A after flexing of the apparatus 10, for example, as illustrated in FIG. 2. In response to flexing of the apparatus 10, there is lateral movement 26 of the perimeter 22 of the modifier 20 relative to the sensor 12. This movement modifies sensing of a parameter by the sensor 12.

In the examples of FIGS. 3A and 3B, but not necessarily all examples, the flexing of the apparatus 10 brings the sensor 12 and modifier 20 closer together. In this particular example, but not necessarily all examples, the sensor 12 and the modifier 20 do not overlap before flexing (FIG. 3A) and do overlap after flexing (FIG. 3B).

Figure 4A:
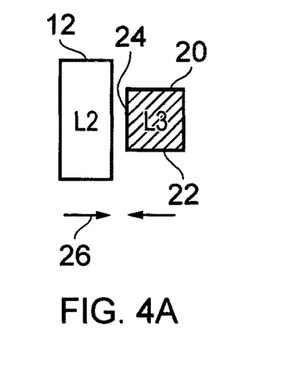
Figure 4B:
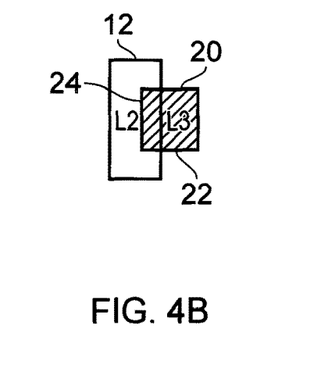

The lateral movement 26 of the perimeter 22 of the modifier 20 relative to the sensor 12 increases as the apparatus 10 is flexed further, for example, to have a greater curvature FIG. 4A illustrates the relative position of a sensor 12 and a modifier 20 along the line B-B illustrated in FIG. 1. FIG. 4B illustrates the relative position of the same sensor 12 and the same modifier 20 along the line B-B after flexing of the apparatus 10, for example, as illustrated in FIG. 2. In response to flexing of the apparatus 10, there is lateral movement 26 of the perimeter 22 of the modifier 20 relative to the sensor 12. This movement modifies sensing of a parameter by the sensor 12.

In the examples of FIGS. 4A and 4B, but not necessarily all examples, the flexing of the apparatus 10 brings the sensor 12 and modifier 20 closer together. In this particular example, but not necessarily all examples, the sensor 12 and the modifier 20 do not overlap before flexing (FIG. 4A) and do overlap after flexing (FIG. 4B).

The lateral movement 26 of the perimeter 22 of the modifier 20 relative to the sensor 12 increases as the apparatus 10 is flexed further, for example, to have a greater curvature In the examples of FIGS. 3A, 3B, 4A and 4B, the perimeter 22 of the modifier 20 defines an edge 24 that is at least partially transverse to the direction of lateral movement 26. The apparatus 10 is configured to enable, responsive to flexing of the flexible substrate 2, movement of the edge 24 relative to the sensor 12. In the illustrated example, but not necessarily all examples, the edge 24 is a transverse edge orthogonal to direction of lateral movement 26.

In some, but not necessarily all examples, a modifier 20 may be associated with a single sensor 12 as illustrated in FIGS. 3A, 3B, 4A, 4B. In other examples, a modifier 20 may be associated with multiple sensors 12. When a modifier moves towards one sensor 12, when the apparatus 10 is flexed, it may move away from another sensor 12.

In the examples of FIGS. 3A, 3B, 4A and 4B, a single modifier 20 is illustrated. However, multiple modifiers 20 may be used and these may be distributed within the third layer L3.

FIG. 6 illustrates an example of an apparatus 10, for example as illustrated in FIG. 1. In this example of the apparatus 10, an intermediate layer 7 is positioned between the second laterally extending layer L2 and the third laterally extending layer L3. The intermediate layer 7 is configured to enable lateral movement 26 between the second layer L2 and the third layer L3. This enables movement of the perimeter 22 of the modifier 20 relative to the plurality of distinct sensors 12, which in turn modifies sensing of the parameter.

The Young's modulus of the intermediate layer 7 positioned between the second laterally extending layer L2 and the third laterally extending layer L3 is less than the Young's modulus of the second laterally extending layer L2 and less than the Young's modulus of the third laterally extending layer L3. This enables deformation of the intermediate layer 7 and slip between the second laterally extending layer L2 and the third laterally extending layer L3.

In some but not necessarily all examples of the apparatus 10, the intermediate layer 7 may be an optically clear adhesive.

In the example of FIG. 6, an optically clear adhesive 5 is also positioned between the second laterally extending layer L2 and the first laterally extending layer L1.

Figure 5:
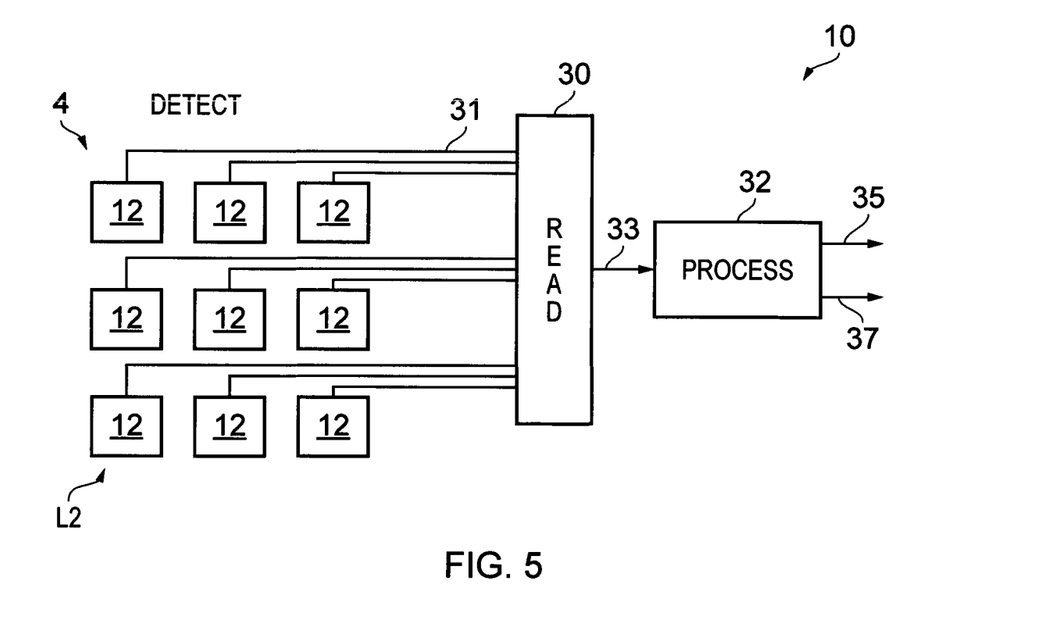
FIG. 5 illustrates an example of reading circuitry for reading outputs from the sensors and an example of processing circuitry for processing the read outputs.

FIG. 5 illustrates one of many possible examples of the apparatus 10. In this example, as in the example of FIGS. 1, 2, 6 and 7, the apparatus 10 comprises in a first laterally extending layer L1, a flexible substrate 2; in a second laterally extending layer L2, a plurality of distinct sensors 12 configured to sense over a sensing area 4; in a third laterally extending layer L3, a modifier 20 comprising a perimeter 22, wherein the apparatus 10 is configured to enable, responsive to flexing of the flexible substrate 2, lateral movement 26 of the perimeter 22 of the modifier 20 relative to the plurality of distinct sensors 12 to modify sensing by one or more of the distinct sensors 12.

FIG. 5 however, illustrates a distribution of the plurality of sensors 12 in the second layer L2 over the sensing area 4, reading circuitry 30 for reading outputs 31 from the sensors 12 and processing circuitry 32 for processing the read outputs 33.

In this example, the plurality of sensors 12 are configured as a touch sensor arrangement to detect touch or proximity of an object 6 at one or more positions in the sensing area 4.

The reading circuitry 30 is configured to read the plurality of distinct sensors 12 to produce outputs 33 dependent upon the existence of touch or proximity of an object 6 at one or more positions in the sensing area 4 and is also configured to read at least some of the plurality of distinct sensors 12 to produce outputs 33 dependent upon flexing of the apparatus 10.

The processing circuitry 32 is configured to process outputs 33 from the reading circuitry 30 to disambiguate between the existence of touch or proximity of an object 6 (see FIGS. 6 & 7) at one or more positions in the sensing area 4 and flexing of the apparatus 10 (see FIGS. 1 and 2). The processing circuitry 32 is configured to produce a touch sensing output 35 or a flex sensing output 37 as a consequence of the disambiguation.

The processing circuitry 32 enables a method comprising: processing outputs from a plurality of distinct sensors 12 distributed over the sensing area 4 of the apparatus 10 to disambiguate between the existence of touch of an object at one or more positions in the sensing area 4 and flexing of the apparatus 10.

If one considers the outputs from the sensors 12, at a particular time, to be a sensing map M comprising sensed parameter values at different locations within the sensing area 4, then the sensing map will have a certain pattern of parameter values when a touch occurs at the sensing area and a different pattern of parameter values when the apparatus 10 is flexed.

Pattern matching algorithms may be used to identify whether or not a sensing map at a particular time corresponds to the expected pattern form one or more touch inputs or the expected pattern from flexing of the apparatus 10. For example, the impact of a touch/proximity input on the sensing map may be localised whereas the impact of a flexing of the apparatus 10 on the sensing map will be determined by the distribution of modifiers 20 over the sensing area 4 and the relative movement between those modifiers 20 and particular sensors 12 as a consequence of strain in the apparatus 10.

Algorithms may be used on the sensing map to identify the location(s) in the sensing area 4 where a touch/proximity input has occurred.

Algorithms may also be used on the sensing map to identify where the apparatus 10 is flexed and/or the extent to which the apparatus 10 is flexed and/or the direction in which it is flexed (e.g. outwardly convex or concave). When the apparatus is flexed, the sensing map provides a map of strain in the apparatus 10.

The algorithms may be configured to compare different sensing maps determined at different times.

The algorithms may be configured to adjust a sensing map before performing analysis to determine flex. For example, if touch inputs are determined at specific locations in the sensing map, the sensing map corresponding to those locations may be disregarded and a sub-set of the sensing map may be used in the algorithm to determine flex.

In one example, the distinct sensors 12 may be distinct light detectors. The sensed parameter may be light intensity. The modifier 20 may be a light optic that absorbs or re-directs light.

If a user touches the apparatus 10 at a sensing area 4 using the object 6, one or more of the light sensors 12 may be totally obscured and experience a sharp fall in the sensed parameter at the location where the touch occurs. The light sensors 12 that are obscured will be localised to only the areas where touch occurs.

If a user flexes the apparatus 10, a pattern of light sensors 12 associated with the modifiers 20 will be partially obscured and experience a fall in the sensed parameter on flexing dependent upon location relative to the flex and the extent of the flex.

The sensing map (i.e. intensity and distribution of detected light) may be used to identify when the apparatus 10 is flexed and may also be used to identify where and to what extent the apparatus 10 is flexed.

Therefore disambiguating between the existence of touch/proximity of an object 6 (see FIG. 7) at one or more positions in the sensing area 4 and flexing of the apparatus 10 (see FIGS. 1 and 2) may be achieved by analysing how the parameters in the sensing map change. For proximity/touch the changes will be localised and may be large. For flexing, the changes may be distributed and variable corresponding to a mapping of strain.

In another example, the distinct sensors 12 may be distinct capacitive sensor electrodes. The sensed parameter may be electric field. Each modifier 20 may be an electrical conductor that modifies the electric field detected by one or more capacitive sensor electrodes 12. If a user touches the apparatus 10 at a sensing area 4 using the object 6, one or more of the capacitive sensor electrodes 12 will have a characteristic 'touch' response. If a user flexes the apparatus 10, a pattern of capacitive sensor electrodes 12 associated with the modifiers 20 will have a characteristic 'flex' response. The sensing map (i.e. intensity and distribution of detected electric field) may be used to identify when the apparatus is flexed and may also be used to identify where and to what extent the apparatus 10 is flexed.

Therefore disambiguating between the existence of touch/proximity of an object 6 (see FIGS. 6 & 7) at one or more positions in the sensing area 4 and flexing of the apparatus 10 (see FIGS. 1 and 2) may be achieved by analysing how the parameters in the sensing map change. For proximity/touch the changes will be localised. For flexing, the changes may be distributed and variable corresponding to a mapping of strain.

In the example of FIG. 5, the reading circuitry 30 and the processing circuitry 32 are comprised in the apparatus 10. In some but not necessarily all embodiments they may be formed from flexible electronics, or alternatively positioned where strain caused by flexing is less.

In other examples, the processing circuitry 32 may be positioned outside the apparatus 10.

Figure 8:
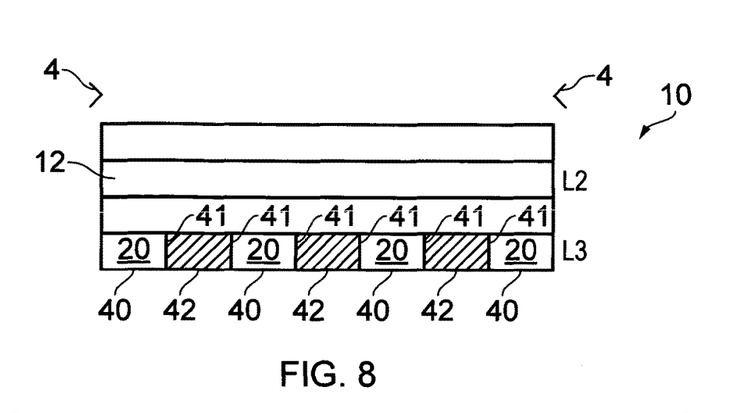
FIG. 8 illustrates an example of an apparatus in which the distinct sensors are distinct capacitive sensor electrodes.

FIG. 8 illustrates an example of an apparatus 10 in which the distinct sensors 12 are distinct capacitive sensor electrodes in layer L2 and the modifiers 20 are portions of a conductor 40 in layer L3.

In the example of FIG. 8, the third layer L3 lies under the second layer L2. That is, in use, the second layer L2 is more outward (closer to an external sensing area 4) than the third layer L3.

The third layer L3 performs two different functions. In a first touch/proximity sending mode it functions as an electromagnetic shielding electrode (bottom guard electrode) for the capacitive sensor electrodes 12. In a second flex sensing mode it functions as a plurality of modifiers 20.

The third layer L3 comprises a first laterally extending conductor 40 and a distinct second laterally extending conductor 42. The first laterally extending conductor 40 and the second laterally extending conductor 42 do not overlap and are separated by a (small) gap 41. The gap 41 between a perimeter 22 of the first laterally extending conductor 40 and a perimeter of the second laterally extending conductor 42 may be constant.

The second laterally extending conductor 42 is continuous across the sensing area 4. In combination, the first laterally extending conductor 40 and the second laterally extending conductor 42 extend across the whole of the sensing area 4.

In the first proximity/touch sensing mode, the first laterally extending conductor 40 and the second laterally extending conductor 42 are electrically connected so that they are at the same voltage. The third layer therefore presents a continuous conductive shield (multi-portion guard electrode) across the whole of the sensing area 4 which protects the capacitive sensor electrodes 12 from stray electric fields.

In the second flex sensing mode, the first laterally extending conductor 40 and the second laterally extending conductor 42 are not electrically connected and they are not at the same voltage.

Figure 9:
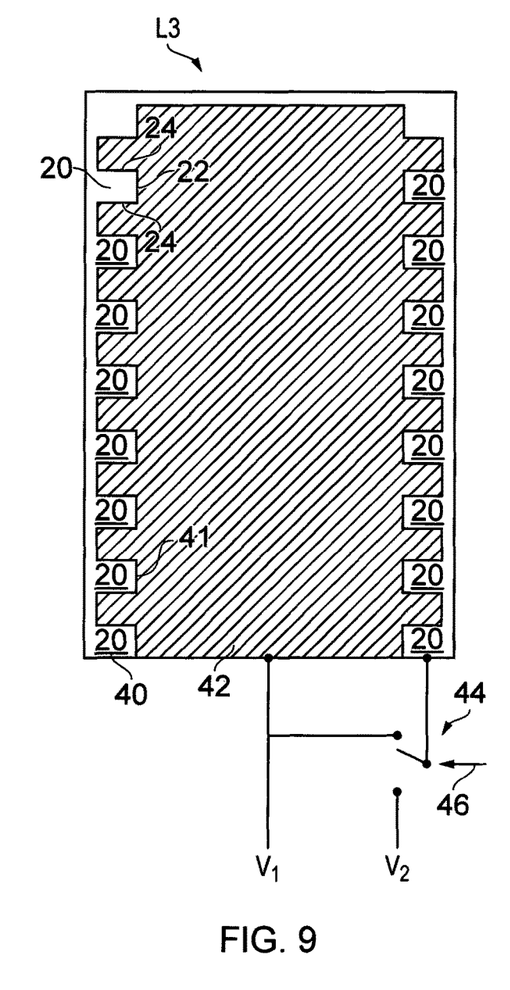
FIGS. 9 and 10 illustrate examples of a third layer for the apparatus in FIG. 8.
Figure 10:
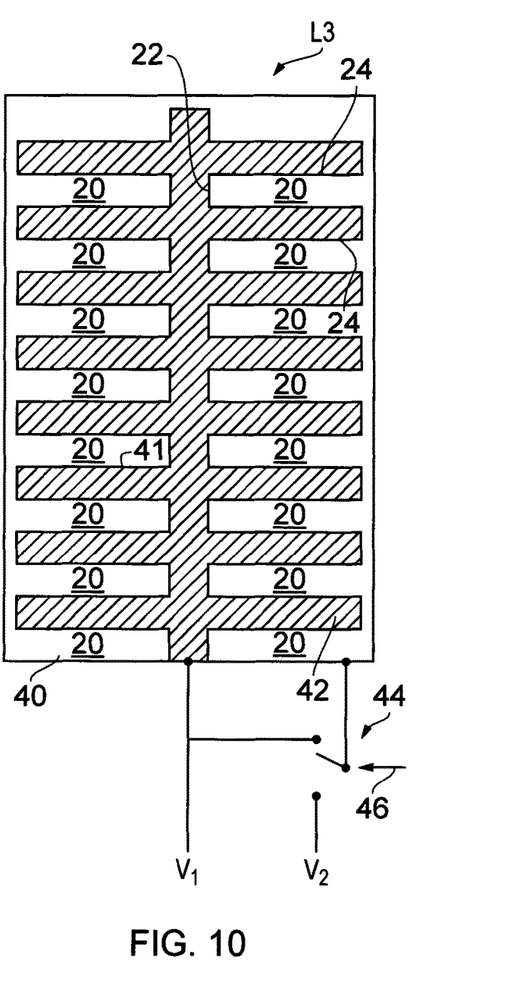

FIGS. 9 and 10 illustrate examples of the third layer L3 for the apparatus 10 in FIG. 8. The first laterally extending conductor 40 and the second laterally extending conductor 42 are distinct but interdigitated.

The first laterally extending conductor 40 is positioned at edges of the sensing area 4. It is discontinuous over the sensing area 4. It has a crenelated two-dimensional pattern comprising recesses closer to the edges and projections further from the edges. The perimeter 22 of the first laterally extending conductor 40 defines edges 24 that are orthogonal to the adjacent edge of the sensing area 4. In FIG. 9, the crenelations are shallow and the projections of the first laterally extending conductor 40 do not extend significantly towards a center of the sensing area 4. In FIG. 10, the crenelations are deep (deeper than they are wide) and the projections of the first laterally extending conductor 40 extend significantly towards a center of the sensing area 4.

A switch 44 is provided which is switched by a mode control signal 46. In the first touch/proximity sensing mode, the switch 44 has a first state which interconnects the first laterally extending conductor 40 and the second laterally extending conductor 42 to the same voltage V1. In the second flex sensing mode, the switch 44 has a second state which disconnects the first laterally extending conductor 40 and the second laterally extending conductor 42, connecting the first laterally extending connector 40 to a different voltage V2.

In the first mode, the voltage V1 may be a time varying voltage, for example, it may be a sinusoidal oscillating voltage.

Figure 11:
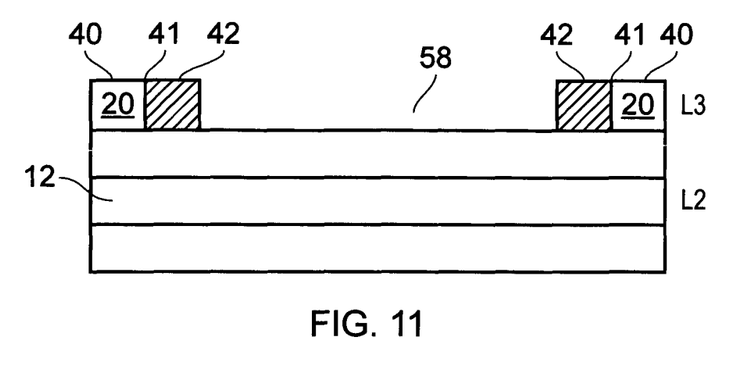
FIG. 11 illustrates an example of an apparatus in which the distinct sensors 12 are distinct capacitive sensor electrodes.

FIG. 11 illustrates an example of an apparatus 10 in which the distinct sensors 12 are distinct capacitive sensor electrodes in layer L2 and the modifiers 20 are portions of conductor 40 in layer L3.

In the example of FIG. 11, the second layer L2 lies under the third layer L3. That is, in use, the third layer L3 is more outward (closer to an external sensing area 4) than the second layer L2.

The third layer L3 performs two different functions. In a first proximity/touch sensing mode it functions as an electromagnetic shielding electrode (top guard electrode) for the capacitive sensor electrodes 12. In a second flex sensing mode it functions as a plurality of modifiers 20.

The third layer L3 comprises a first laterally extending conductor 40 and a distinct second laterally extending conductor 42. The first laterally extending conductor 40 and the second laterally extending conductor 42 do not overlap and are separated by a (small) gap 41. The gap 41 between a perimeter 22 of the first laterally extending conductor 40 and a perimeter of the second laterally extending conductor 42 may be constant.

The second laterally extending conductor 42 is not continuous across the sensing area 4. It comprises an aperture 58 to the sensing area 4. In combination, the first laterally extending conductor 40 and the second laterally extending conductor 42 form a combined conductive area. The combined conductive area extends around a periphery of the sensing area 4.

In the first proximity/touch sensing mode, the first laterally extending conductor 40 and the second laterally extending conductor 42 are electrically connected so that they are at the same voltage. The third layer L3 therefore presents a continuous conductive shield (multi-portion guard electrode) at the edges of the sensing area 4 which protects the capacitive sensor electrodes 12 from stray electric fields.

In the second flex sensing mode, the first laterally extending conductor 40 and the second laterally extending conductor 42 are not electrically connected and they are not at the same voltage.

Figure 12:
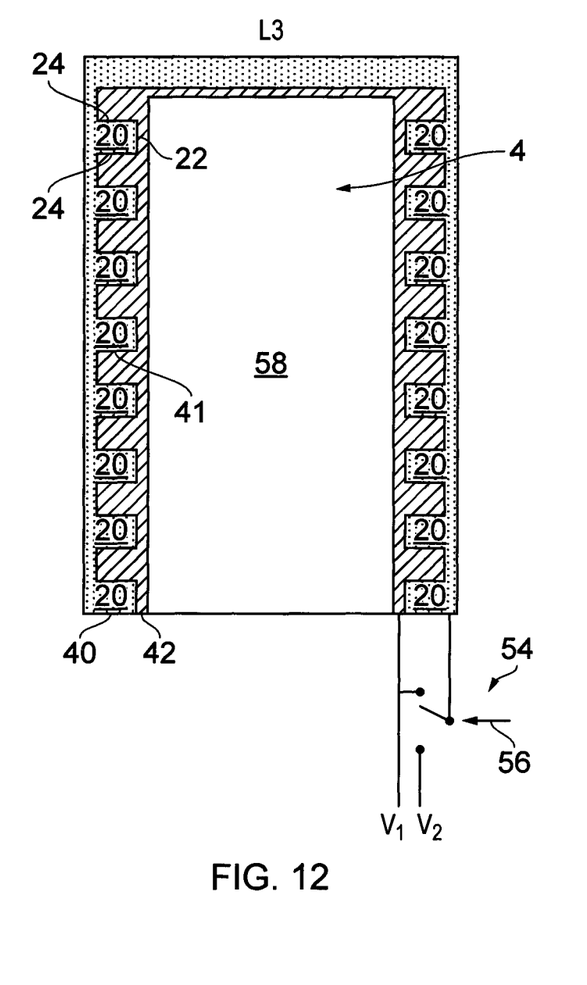
FIG. 12 illustrates an example of the third layer for the apparatus in FIG. 11.

FIG. 12 illustrates an example of the third layer L3 for the apparatus 10 in FIG. 11. The first laterally extending conductor 40 and the second laterally extending conductor 42 are distinct but interdigitated.

In the illustrated example, the combined conductive area, formed from the first laterally extending conductor 40 and the second laterally extending conductor 42 is discontinuous over the sensing area. It is positioned towards edges of the sensing area 4, extending around a periphery of the sensing area 4.

The first laterally extending conductor 40, in this example, is positioned at edges of the sensing area 4. It is discontinuous over the sensing area 4. It has a crenelated two-dimensional pattern comprising recesses closer to the edges and projections further from the edges. The perimeter 22 of the first laterally extending conductor 40 defines edges 24 that are orthogonal to the adjacent edge of the sensing area 4. In FIG. 12, the crenelations are shallow and the projections of the first laterally extending conductor 40 do not extend significantly towards a center of the sensing area 4.

A switch 54 is provided which is switched by a mode control signal 56. In the first proximity/touch sensing mode, the switch 56 has a first state which interconnects the first laterally extending conductor 40 and the second laterally extending conductor 42 to the same voltage V1. In the second flex sensing mode, the switch 56 has a second state which disconnects the first laterally extending conductor 40 and the second laterally extending conductor 42, connecting the first laterally extending connector 40 to a different voltage V2.

In the first mode, the voltage V1 may be a time varying voltage, for example, it may be a sinusoidal oscillating voltage.

In the illustrated examples of FIGS. 11 and 12, the combined conductive area is discontinuous over the sensing area and is positioned towards edges of the sensing area 4, forming a perimeter to a large central aperture 58. However, in other examples, for example as illustrated in FIG. 20, the combined conductive area may also be discontinuous over the sensing area 4, but have multiple smaller apertures 58 over the sensing area 4 and be positioned over the whole of the sensing area 4.

Figure 20:
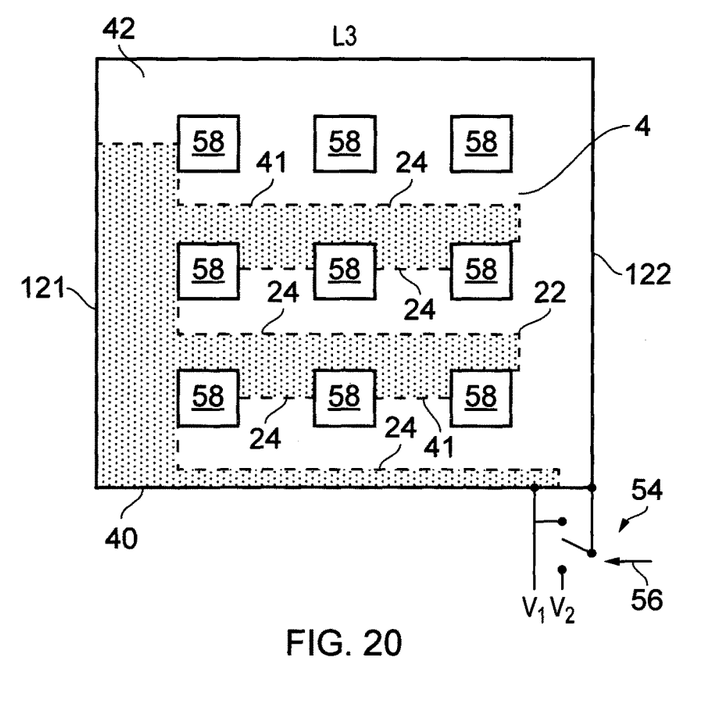
FIG. 20 illustrates an alternative example of the third layer for the apparatus in FIG. 11.

FIG. 20 illustrates an alternative third layer L3, which may replace the third layer L3 illustrated in FIG. 12. The third layer L3 in FIGS. 12 and 20 are similar in many respects and the previous description provided in relation to FIG. 12 is also relevant to FIG. 20. However, there are some differences.

In FIG. 20, the combined conductive area extends over the sensing area 4 and is not confined to the periphery of the sensing area 4. In FIG. 20, the combined conductive area is punctuated by multiple smaller apertures 58.

In the first proximity/touch sensing mode, the first laterally extending conductor 40 and the second laterally extending conductor 42 are electrically connected so that they are at the same voltage. The third layer L3 therefore presents a continuous conductive shield (multi-portion guard electrode) over the sensing area 4 except where there are apertures 58.

In the second flex sensing mode, the first laterally extending conductor 40 and the second laterally extending conductor 42 are not electrically connected and they are not at the same voltage.

In FIG. 20, as in FIG. 12, in the third layer L3, a first laterally extending conductor 40 and a second laterally extending conductor 42 are distinct but interdigitated. The first laterally extending conductor 40 and the second laterally extending conductor 42 do not overlap and are separated by a (small) gap 41.

In the illustrated example, the combined conductive area, formed from the first laterally extending conductor 40 and the second laterally extending conductor 42 is discontinuous over the sensing area. It is positioned over the sensing area but punctured by multiple apertures 58.

The first laterally extending conductor 40, in this example, is positioned at a first edge 121 of the sensing area 4. It is discontinuous over the sensing area 4. It has a crenelated two-dimensional pattern comprising recesses closer to the first edge 121 and projections towards a second edge 122 opposite the first edge 121. The perimeter 22 of the first laterally extending conductor 40 defines edges 24 that are orthogonal to the first edge 121 of the sensing area 4. In FIG. 20, the crenelations are deep and the projections of the first laterally extending conductor 40 extend beyond a center of the sensing area 4. The first laterally extending conductor 40 is adjacent each aperture 58 but does not surround the apertures 58.

The second laterally extending conductor 42, in this example, is positioned at the second edge 122 of the sensing area 4. It is discontinuous over the sensing area 4. It has a crenelated two-dimensional pattern comprising recesses closer to the second edge 122 and projections towards the first edge 121. The second laterally extending conductor 40 is adjacent each aperture 58 but does not surround the apertures 58.

A switch 54 is provided which is switched by a mode control signal 56. In the first proximity/touch sensing mode, the switch 56 has a first state which interconnects the first laterally extending conductor 40 and the second laterally extending conductor 42 to the same voltage V1. In the second flex sensing mode, the switch 56 has a second state which disconnects the first laterally extending conductor 40 and the second laterally extending conductor 42, connecting the second laterally extending connector 42 to a different voltage V2 while keeping the first laterally extending conductor 40 connected to the voltage V1.

In the first mode, the voltage V1 may be a time varying voltage, for example, it may be a sinusoidal oscillating voltage.

Figure 13:
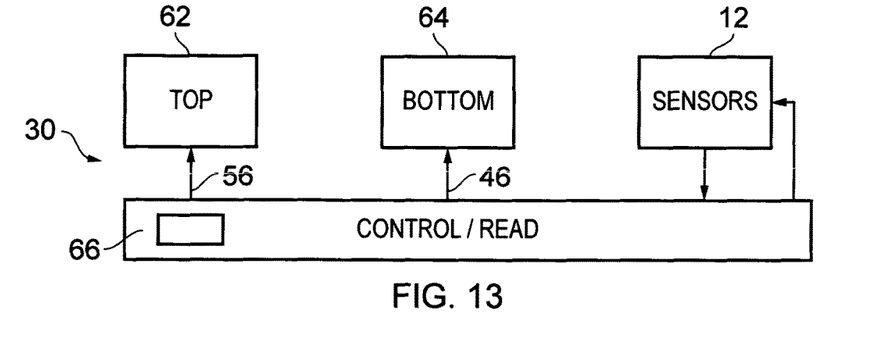
FIG. 13 illustrates an example of reading circuitry and controlling circuitry.

FIG. 13 illustrates an example of reading circuitry 30, previously described with reference to FIG. 5, which is suitable for use with the examples of the multi-portion electrodes illustrated in FIGS. 8 to 12. FIGS. 8 to 10 illustrate examples where the first laterally extending conductor 40 and the second laterally extending conductor 42 form a multi-portion bottom electrode 64. FIGS. 11 and 12 illustrate examples where the first laterally extending conductor 40 and the second laterally extending conductor 42 form a multi-portion top electrode 62.

The reading circuitry 30 may be used with no multi-portion electrode, or with a top multi-portion electrode 62, or with a bottom multi-portion electrode 64, or with both a top multi-portion electrode 62 and a bottom multi-portion electrode 64.

The reading circuitry 30 additionally provides control circuitry 66 which is used to, for example, control the mode of a multi-portion electrode. Although the control circuitry 66 is illustrated as part of the reading circuitry 30 in this example, in other examples it may be part of different circuitry such as the processing circuitry 32 or separate to both the reading circuitry 30 and the processing circuitry 32.

If a multi-portion top electrode 62 is present, the control circuitry 66 is configured to control the mode of the multi-portion top electrode 62. In the first proximity/touch sensing mode the multi-portion top electrode 62 operates as a guard electrode with the first laterally extending conductor 40 and the second laterally extending conductor 42 electrically connected so that they are at the same voltage. In the second flex sensing mode, the multi-portion top electrode 62 provides modifiers 20.

If a multi-portion bottom electrode 64 is present, the control circuitry 66 is configured to control the mode of the multi-portion bottom electrode 64. In the first proximity/touch sensing mode the multi-portion bottom electrode 64 operates as a guard electrode with the first laterally extending conductor 40 and the second laterally extending conductor 42 electrically connected so that they are at the same voltage. In the second flex sensing mode, the multi-portion bottom electrode 64 provides modifiers 20.

The control circuitry 66 may, for example, be configured to control the mode of a multi-portion bottom electrode 64 (FIGS. 8 to 10) and/or control the mode of a multi-portion top electrode 62 (FIGS. 11 and 12).

The control circuitry 66 may for example, enable a first touch/proximity sensing mode by enabling both a top guard electrode and a bottom guard electrode. That is, the control circuitry 66 sets the mode control signal 56 to enable the first touch/proximity sensing mode at the multi-portion top electrode 62 which then functions as a guard electrode and the control circuitry 66 sets the mode control signal 46 to enable the first touch/proximity sensing mode at the multi-portion bottom electrode 64 which then functions as a guard electrode.

The control circuitry 66 may for example, enable a second flex sensing mode by controlling either or both of the multi-portion top electrode 62 and the multi-portion bottom electrode 64 to provide modifiers 20. That is, the control circuitry 66 sets the mode control signal 56 to enable the second flex sensing mode at the multi-portion top electrode 62 and/or the control circuitry 66 sets the mode control signal 46 to enable the second flex sensing mode at the multi-portion bottom electrode 64.

When the control circuitry 66 enable a touch/proximity sensing mode, both the multi-portion top electrode 62 and the multi-portion bottom electrode 64 may be fed by the same oscillating voltage.

The mode control signals 46, 56 may be provided to the processing circuitry 32 to facilitate processing of the outputs from the sensors 12. The algorithms used by the processing circuitry 32 may, for example, be configured to compare different sensing maps determined at different modes to determine flex. The control circuitry 66 may repeatedly switch the apparatus 10 between the first mode and the second mode. The algorithms may be configured to adjust a sensing map before performing analysis to determine flex. For example, if touch inputs are determined at specific locations in the sensing map for the first mode, the sensing map corresponding to those locations may be disregarded and a sub-set of the sensing map for the second mode may be used in the algorithms to determine flex.

The controlling circuitry 32 enables a method comprising: in a first touch sensing mode of an apparatus 10, electrically interconnecting a first conductive portion 40 and a second conductive portion 42 to form a guard electrode for a plurality of capacitive sensor electrodes 12; and
in a second flex sensing mode, electrically disconnecting the first conductive portion 40 and the second conductive portion 42 to form
at least one modifier 20 comprising a perimeter 22, wherein, in response to flexing the apparatus 10, the perimeter 22 of the modifier 20 moves relative to the plurality of capacitive sensor electrodes 12 to modify sensing by at least one of the capacitive sensor electrodes 12.

Figure 14:
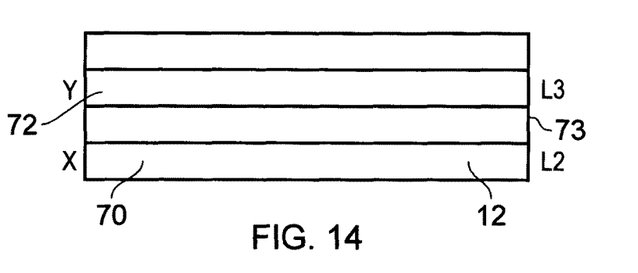
FIG. 14 illustrates another example of an apparatus in which the distinct sensors are distinct capacitive sensor electrodes in the second layer.

FIG. 14 illustrates an example of an apparatus 10 in which the distinct sensors 12 are distinct capacitive sensor electrodes in layer L2 and the modifiers 20 are conductive portions in layer L3.

In the example of FIG. 14, the second layer L2 lies under the third layer L3. That is, in use, the third layer L3 is more outward (closer to an external sensing area 4) than the second layer L2. However the layers may be reversed.

Figure 15:
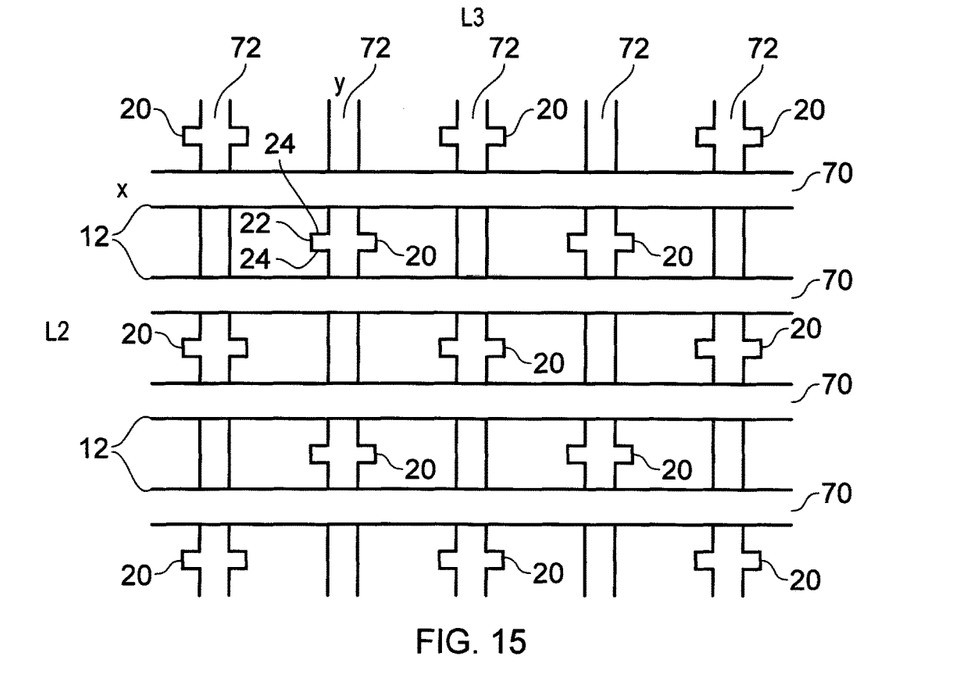
FIG. 15 illustrates an example of the third layer and the overlying second layer for the apparatus in FIG. 14.

FIG. 15 illustrates an example of the third layer L3 and the overlying second layer L2 for the apparatus 10 in FIG. 14.

In FIGS. 14 and 15, the apparatus 10 comprises a plurality of first distinct conductive strips 70 that extend in the x-direction in the second layer L2 and a plurality of distinct second conductive strips 72 that extend in the y-direction in the third layer L3. The second layer L2 and the third layer L3 are separated by a dielectric 73. Where the first conductive strips 70 and the second conductive strips 72 overlap capacitors are formed.

If a conductive object 6 approaches or touches the apparatus 10, the capacitance value of the nearest capacitor changes and this change may be detected. The plurality of distinct first conductive strips 70 therefore operate as capacitive sensor electrodes (capacitive sensors 12).

In this example, the conductive strips 72 in the third layer comprise modifiers 20. In this example, the modifiers are conductive projections (stubs) from the conductive strips 72 in the x-direction. The projections have a perimeter 22 and edges 24 parallel to the x direction.

The apparatus 10 is configured to enable, responsive to flexing of the apparatus 10, lateral movement of the perimeter 22 of the modifier 20 relative to the plurality of distinct capacitive sensor electrodes 12, 70 to modify sensing by one or more of the distinct capacitive sensor electrodes 12, 70.

Implementation of the processing circuitry 32 can be in hardware alone (a circuit, a processor), have certain aspects in software including firmware alone or can be a combination of hardware and software (including firmware).

Implementation of the controlling circuitry 66 can be in hardware alone (a circuit, a processor), have certain aspects in software including firmware alone or can be a combination of hardware and software (including firmware).

The processing circuitry 32 and the controlling circuitry 66 can be implemented in the same circuitry or in different circuitry.

Figure 16:
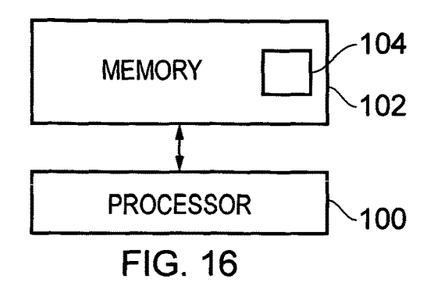
FIG. 16 illustrates an example of circuitry suitable for use as the processing circuitry and/or the controlling circuitry.

Referring to FIG. 16, the processing circuitry 32 and/or the controlling circuitry 66 may be implemented using instructions that enable hardware functionality, for example, by using executable computer program instructions 104 in a general-purpose or special-purpose processor 100 that may be stored on a computer readable storage medium (disk, memory etc) 102 to be executed by such a processor 100.

The processor 100 is configured to read from and write to the memory 102. The processor 100 may also comprise an output interface via which data and/or commands are output by the processor 100 and an input interface via which data and/or commands are input to the processor 100.

The memory 102 stores a computer program 104 comprising computer program instructions (computer program code) that controls the operation of the apparatus 10 when loaded into the processor 100. The computer program instructions, of the computer program 104, provide the logic and routines that enables the apparatus to perform the methods described. The processor 100 by reading the memory 102 is able to load and execute the computer program 104.

The processing circuitry 32 may therefore comprise: at least one processor 100; and at least one memory 102 including computer program code 104
the at least one memory 102 and the computer program code 104 configured to, with the at least one processor 100, cause the apparatus 10 at least to perform: processing outputs from a plurality of distinct sensors 12 distributed over a sensing area 4 of an apparatus 10 to disambiguate between the existence of touch of an object at one or more positions in the sensing area 4 and flexing of the apparatus 10.

The controlling circuitry 66 may therefore comprise: at least one processor 100; and at least one memory 102 including computer program code 104
the at least one memory 102 and the computer program code 104 configured to, with the at least one processor 100, cause the apparatus 10 at least to perform:
in a first touch sensing mode, electrically interconnecting a first conductive portion 40 and a second conductive portion 42 to form a guard electrode for a plurality of capacitive sensor electrodes 12; and
in a second flex sensing mode, electrically disconnecting the first conductive portion 40 and the second conductive portion 42 to form at least one modifier 20 comprising a perimeter 22, wherein, in response to flexing the apparatus 10, the perimeter 22 of the modifier 20 moves relative to the plurality of capacitive sensor electrodes 12 to modify sensing by at least one of the capacitive sensor electrodes 12.

Figure 17:
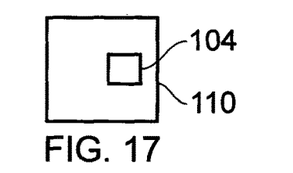
FIG. 17 illustrates an example of a record medium for a computer program.

As illustrated in FIG. 17, a computer program 104 may arrive at the apparatus 10 via any suitable delivery mechanism 110. The delivery mechanism 110 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 104. The delivery mechanism may be a signal configured to reliably transfer the computer program 104. The apparatus 10 may propagate or transmit the computer program 104 as a computer data signal.

Although the memory 102 is illustrated as a single component it may be implemented as one or more separate components some or all of which may be integrated/removable and/or may provide permanent/semi-permanent/dynamic/cached storage.

Although the processor 100 is illustrated as a single component it may be implemented as one or more separate components some or all of which may be integrated/removable.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Figure 18:
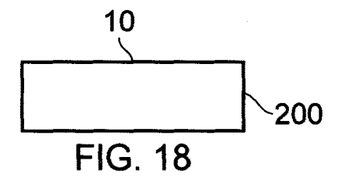
FIG. 18 illustrates an example of the apparatus embodied as a flexible touch panel module 200.
Figure 19:
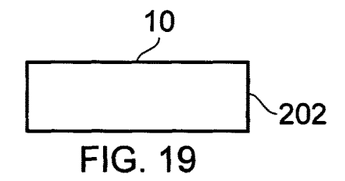
FIG. 19 illustrates an example of the apparatus embodied as a flexible touch sensitive display module 202.

FIG. 18 illustrates an example of the apparatus 10 embodied as a flexible touch panel module 200. This may, for example, be combined with a flexible display to form a flexible touch sensitive display module 202 as illustrated in FIG. 19.

The touch panel module may be capacitive or optical. An additional layer comprising a modifier may also be attached on top of the display.

As used here 'module' refers to a unit or apparatus that excludes certain parts/components that would be added by an end manufacturer or a user.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   in a first laterally extending layer, a flexible substrate;
   in a second laterally extending layer, a plurality of distinct sensors configured to sense over a sensing area;
   in a third laterally extending layer, a modifier comprising a perimeter,
   wherein the apparatus is configured to enable, responsive to flexing of the flexible substrate, lateral movement of the perimeter of the modifier relative to the plurality of distinct sensors to modify sensing by one or more of the distinct sensors;
   further comprising reading circuitry configured to read the plurality of distinct sensors to produce outputs dependent upon the existence of touch or proximity of an object at one or more positions in the sensing area and configured to read at least one sensor of the plurality of distinct sensors to produce outputs dependent upon flexing of the apparatus.

2. An apparatus as claimed in claim 1, wherein the plurality of sensors are configured to detect touch or proximity of an object at one or more positions in the sensing area.

3. An apparatus as claimed in claim 1, further comprising processing circuitry configured to process outputs from the reading circuitry to disambiguate between the existence of touch or proximity of an object at one or more positions in the sensing area and flexing of the apparatus.

4. An apparatus as claimed in claim 1, wherein the perimeter defines an edge that is at least partially transverse to the direction of movement and wherein the apparatus is configured to enable, responsive to flexing the flexible substrate, movement of the edge relative to the plurality of distinct sensors.

5. An apparatus as claimed in claim 4, wherein the edge is a transverse edge orthogonal to the direction of movement.

6. An apparatus as claimed in claim 1, wherein an intermediate layer is positioned between the second laterally extending layer and the third laterally extending layer and is configured to enable lateral movement of the perimeter of the modifier relative to the plurality of distinct sensors to modify sensing.

7. An apparatus as claimed in claim 6, wherein the intermediate layer is optically clear adhesive.

8. An apparatus as claimed in claim 6, wherein the intermediate layer has a Young's modulus less than a Young's modulus of the second laterally extending layer and less than a Young's modulus of the third laterally extending layer.

9. An apparatus as claimed in claim 1, wherein the apparatus is flexible and has an upper surface and a lower surface, wherein the apparatus is configured such that the upper surface and the lower surface are both curved in the same sense by flexing.

10. An apparatus as claimed in claim 1, wherein the distinct sensors comprise distinct light detectors and the modifier is a light optic that absorbs or redirects light.

11. An apparatus as claimed in claim 1, wherein the distinct sensors comprise distinct capacitive sensor electrodes and the modifier is provided by a first conductive portion.

12. An apparatus as claimed in claim 11, wherein, the third layer comprises a multi-portion electrode comprising the first conductive portion and at least a second conductive portion.

13. An apparatus as claimed in claim 12, wherein the first conductive portion and the second conductive portion are separated by a narrow gap.

14. An apparatus as claimed in claim 12, wherein the first conductive portion and the second conductive portion are interdigitated.

15. An apparatus as claimed in claim 12, further comprising control circuitry configured, in a first mode, to electrically interconnect the first conductive portion and the second conductive portion and in a second mode to electrically disconnect the first conductive portion and the second conductive portion.

16. An apparatus as claimed in claim 15, wherein the control circuitry is configured to enable a time varying voltage to be provided to both the first conductive portion and the second conductive portion.

17. An apparatus as claimed in claim 1 embodied as a touch panel module.

18. A method comprising:
   in a first touch sensing mode of an apparatus, electrically interconnecting a first conductive portion and a second conductive portion to form a guard electrode for a plurality of capacitive sensor electrodes; and
   in a second flex sensing mode, electrically disconnecting the first conductive portion and the second conductive portion to form at least one modifier comprising a perimeter, wherein, in response to flexing the apparatus, the perimeter of the modifier moves relative to the plurality of capacitive sensor electrodes to modify sensing by at least one of the capacitive sensor electrodes;

wherein electrically disconnecting the first conductive portion and the second conductive portion comprises switching from a first state to a second state, the switching comprising disconnecting the first conductive portion and the second conductive portion and connecting the second conductive portion to a voltage V2 while keeping the first conductive portion connected to a voltage V1;

further comprising reading, using reading circuitry, the plurality of capacitive sensor electrodes to produce outputs dependent upon the existence of touch or proximity of an object at one or more positions in a sensing area and reading at least one capacitive sensor electrode of the plurality of capacitive sensor electrodes to produce outputs dependent upon flexing of the apparatus.

19. A flexible apparatus comprising:
in a laterally extending sensing layer, a plurality of distinct sensors configured to sense over a sensing area;
in a laterally extending modifier layer, a modifier comprising a perimeter, wherein the apparatus is configured to enable, responsive to flexing of the apparatus, lateral movement of the perimeter of the modifier relative to the plurality of distinct sensors to modify sensing by one or more of the distinct sensors; and
further comprising reading circuitry configured to read the plurality of distinct sensors to produce outputs dependent upon the existence of touch or proximity of an object at one or more positions in the sensing area and configured to read at least one sensor of the plurality of distinct sensors to produce outputs dependent upon flexing of the flexible apparatus.

* * * * *